(12) United States Patent
Lindberg et al.

(10) Patent No.: US 6,247,460 B1
(45) Date of Patent: Jun. 19, 2001

(54) VORTEX TUBE AFFIXED TO A TURBOCHARGER, SUPERCHARGER OR INTAKE MANIFOLD OF AN ENGINE

(76) Inventors: Roderick Lee Lindberg; W. Stan Lewis, both of 210 E. Broadway, Vista, CA (US) 92084

( * ) Notice: Subject to any disclaimer, the term of this patent is extended or adjusted under 35 U.S.C. 154(b) by 0 days.

(21) Appl. No.: 09/351,172

(22) Filed: Jul. 12, 1999

(51) Int. Cl.[7] ..................................... F02B 33/00
(52) U.S. Cl. ..................... 123/563; 123/559.1; 55/315; 62/5; 60/599
(58) Field of Search ..................... 123/563, 1 A, 123/559.1; 60/599, 605.1; 55/315, 319; 62/5

(56) References Cited

U.S. PATENT DOCUMENTS

| | | | |
|---|---|---|---|
| 3,884,658 | * 5/1975 | Roach | 55/315 |
| 4,482,365 | * 11/1984 | Roach | 55/315 |
| 5,472,463 | * 12/1995 | Herman et al. | 55/319 |
| 5,561,982 | * 10/1996 | Tunkel et al. | 62/5 |
| 5,819,541 | * 10/1998 | Tunkel et al. | 62/5 |
| 5,950,436 | * 9/1999 | Tunkel et al. | 62/5 |

* cited by examiner

*Primary Examiner*—Thomas Denion
*Assistant Examiner*—Thai-Ba Trieu
(74) *Attorney, Agent, or Firm*—Tom Hamill, Jr.

(57) ABSTRACT

A vortex tube is affixed in a first case to a turbocharger in an engine, in a second case to a supercharger in an engine, or in a third case to the intake manifold of an engine. A vortex tube includes an entry port, a cold exit port and a hot exit port. By employing different structural interconnections of the vortex tube with the turbocharger or supercharger, compressed air is cooled prior to entering the engine's intake manifold. The same effect is achieved when the vortex tube is affixed directly to the engine intake manifold. Additionally, the fuel may be heated or cooled, depending upon the specific fuel type utilized.

3 Claims, 21 Drawing Sheets

VORTEX TUBE AFFIXED TO A TURBOCHARGER, SUPERCHARGER OR INTAKE MANIFOLD OF AN ENGINE

BACKGROUND OF THE INVENTION

1. Field of the Invention

The present invention relates generally to employing a vortex tube in an engine, to cool air prior to the air entering the intake manifold. The vortex tube may be employed with a turbocharger, a supercharger or with an engine which does not include an air compressor.

2. Description of the Prior Art

Various applications of both the heating and cooling aspects of the vortex tube are known in the art. The current invention discloses a method and apparatus for employing a vortex tube with various engine compressor assemblies and in other direct arrangements for cooling the intake air to the engine manifold, whether it be compressed or not.

Additionally, various methods have been employed to both heat and cool fuel prior to combustion. The current invention discloses a method and apparatus for employing a vortex tube in the configurations described herein, which permits the fuel to be heated or cooled by the action of the vortex tube.

None of the methodologies employed and claimed herein have been shown or taught in any prior art of record.

SUMMARY OF THE INVENTION

A vortex tube is affixed in a first case to a turbocharger in an engine, in a second case to a supercharger in an engine, or in a third case to the intake manifold of an engine. A vortex tube includes an entry port, a cold exit port and a hot exit port. By employing different structural interconnections of the vortex tube with the turbocharger or supercharger, compressed air is cooled prior to entering the engine's intake manifold. The same effect is achieved when the vortex tube is affixed directly to the engine intake manifold. Additionally, the fuel may be heated or cooled by a heat transfer arrangement.

In the first case, the vortex tube is affixed to a turbocharger in an engine. The turbocharger includes an ambient air inlet and a compressed air outlet, the compressive energy coming from the exhaust gasses of the engine. The vortex tube has an entry port, cold exit port and a hot exit port. In a first embodiment, the vortex tube entry port is placed in communication with the turbocharger's compressed air outlet by any conventional means. This causes the compressed air to enter the vortex tube, and be separated into a hot portion and a cold portion. The cold portion exits the vortex tube cold exit port and is routed to the engine's intake manifold. The hot portion exits the vortex tube hot exit port and is routed to a heat sink. It has been considered that it may be desirable to place the fuel line in proximal relation to the hot exit port, permitting heat to transfer to the fuel. This is particularly advantageous in a fuel such as diesel fuel, propane, liquified natural gas or the like.

In a second embodiment, the vortex tube entry port is placed in communication with the turbocharger's compressed air outlet by any conventional means. This causes the compressed air to enter the vortex tube, and be separated into a hot portion and a cold portion. The cold portion exits the vortex tube cold exit port and is routed to the engine's intake manifold. The hot portion exits the vortex tube hot exit port and is routed to a vacuum source. The vacuum source may be provided by any of a variety of negative pressure inducing means. It has again been considered that it may be desirable to place the fuel line in proximal relation to the hot exit port, permitting heat to transfer to the fuel. This is particularly advantageous in a fuel such as diesel fuel, propane, liquified natural gas or the like.

In a third embodiment, the vortex tube entry port is placed in communication with the turbocharger's compressed air outlet by any conventional means. This causes the compressed air to enter the vortex tube, and be separated into a hot portion and a cold portion. The cold portion exits the vortex tube cold exit port and is routed to the engine's intake manifold. The hot portion exits the vortex tube hot exit port and is routed to a heat sink. It has been considered that it may be desirable to place the fuel line in proximal relation to the cold exit port, permitting heat to transfer from the fuel. This is particularly advantageous in a fuel such as gasoline.

In a fourth embodiment, the vortex tube entry port is placed in communication with the turbocharger's compressed air outlet by any conventional means. This causes the compressed air to enter the vortex tube, and be separated into a hot portion and a cold portion. The cold portion exits the vortex tube cold exit port and is routed to the engine's intake manifold. The hot portion exits the vortex tube hot exit port and is routed to a vacuum source. The vacuum source may be provided by any of a variety of negative pressure inducing means. It has again been considered that it may be desirable to place the fuel line in proximal relation to the cold exit port, permitting heat to transfer from the fuel. This is particularly advantageous in a fuel such as gasoline.

In a fifth embodiment, the vortex tube cold exit port is placed in communication with the turbocharger's ambient air inlet by any conventional means. Air is caused to enter the vortex tube entry port, by action of the turbocharger, where it is separated into a hot portion and a cold portion. The cold portion exits the vortex tube cold exit port and is directed into the turbocharger's ambient air inlet. This cooled air is then compressed by the turbocharger, where it exits the compressed air outlet, still in a cooled condition. The compressed air outlet of the turbocharger is in communication with the engine's intake manifold. The hot portion exits the vortex tube hot exit port and is routed to a heat sink and vacuum source. Again, it has been considered that in a first case that it may be desirable to place the fuel line in proximal relation to the hot exit port, permitting heat to transfer to the fuel. This is particularly advantageous in a fuel such as diesel. Also, it has been considered that in a second case that it may be desirable to place the fuel line in proximal relation to the cold exit port, permitting heat transfer from the fuel. This is especially advantageous in a fuel such as gasoline.

In the second case, the vortex tube is affixed to a supercharger in an engine. The supercharger includes an ambient air inlet and a compressed air outlet, the compressive energy coming from a mechanical connection to the crankshaft. The vortex tube has an entry port, cold exit port and a hot exit port. In a sixth embodiment, the vortex tube entry port is placed in communication with the supercharger's compressed air outlet by any conventional means. This causes the compressed air to enter the vortex tube, and be separated into a hot portion and a cold portion. The cold portion exits the vortex tube cold exit port and is routed to the engine's intake manifold. The hot portion exits the vortex tube hot exit port and is routed to a heat sink. It has been considered that it may be desirable to place the fuel line in proximal relation to the hot exit port, permitting heat to transfer to the fuel. This is particularly advantageous in a fuel such as diesel.

In a seventh embodiment, the vortex tube entry port is placed in communication with the supercharger's compressed air outlet by any conventional means. This causes the compressed air to enter the vortex tube, and be separated into a hot portion and a cold portion. The cold portion exits the vortex tube cold exit port and is routed to the engine's intake manifold. The hot portion exits the vortex tube hot exit port and is routed to a vacuum source. The vacuum source may be provided by any of a variety of negative pressure inducing means. It has again been considered that it may be desirable to place the fuel line in proximal relation to the hot exit port, permitting heat to transfer to the fuel. This is particularly advantageous in a fuel such as diesel.

In a eighth embodiment, the vortex tube entry port is placed in communication with the supercharger's compressed air outlet by any conventional means. This causes the compressed air to enter the vortex tube, and be separated into a hot portion and a cold portion. The cold portion exits the vortex tube cold exit port and is routed to the engine's intake manifold. The hot portion exits the vortex tube hot exit port and is routed to a heat sink and vacuum source. The vacuum source may be provided by any of variety of negative pressure inducing means. It has been considered that it may be desirable to place the fuel line in proximal relation to the cold exit port, permitting heat to transfer from the fuel. This is particularly advantageous in a fuel such as gasoline.

In a ninth embodiment, the vortex tube entry port is placed in communication with the supercharger's compressed air outlet by any conventional means. This causes the compressed air to enter the vortex tube, and be separated into a hot portion and a cold portion. The cold portion exits the vortex tube cold exit port and is routed to the engine's intake manifold. The hot portion exits the vortex tube hot exit port and is routed to a heat source. It has again been considered that it may be desirable to place the fuel line in proximal relation to the cold exit port, permitting heat to transfer from the fuel. This is particularly advantageous in a fuel such as gasoline.

In a tenth embodiment, the vortex tube cold exit port is placed in communication with the supercharger's ambient air inlet by any conventional means. Air is caused to enter the vortex tube entry port, by action of the supercharger, where it is separated into a hot portion and a cold portion. The cold portion exits the vortex tube cold exit port and is directed into the supercharger's ambient air inlet. This cooled air is then compressed by the supercharger, where it exits the compressed air outlet, still in a cooled condition. The compressed air outlet of the supercharger is in communication with the engine's intake manifold. The hot portion exits the vortex tube hot exit port and is routed to a heat sink and vacuum source. Again, it has been considered that in a first case that it may be desirable to place the fuel line in proximal relation to the hot exit port, permitting heat to transfer to the fuel. This is particularly advantageous in a fuel such as diesel. Also, it has been considered that in a second case that it may be desirable to place the fuel line in proximal relation to the cold exit port, permitting heat transfer from the fuel. This is especially advantageous in a fuel such as gasoline.

In an eleventh embodiment it has been considered placing a vortex tube with the cold exit port in communication with the engine's intake manifold. The hot exit would be in communication with a vacuum source as described before. Air would enter the vortex tube's entry port where it would be separated into the hot and cold components. The cooled air would enter the engine manifold. Similar arrangements as described in previous embodiments concerning the heating or cooling of fuel may also be employed in this embodiment.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to connect a vortex tube to the compressed air outlet of a turbocharger in an engine.

It is a further object of the present invention to connect a vortex tube to the ambient air inlet of a turbocharger in an engine.

It is therefore an object of the present invention to connect a vortex tube to the compressed air outlet of a supercharger in an engine.

It is a further object of the present invention to connect a vortex tube to the ambient air inlet of a supercharger in an engine.

It is a further object of the present invention to connect a vortex tube to an engine's intake manifold.

Additional objects, advantages and novel features of the invention will be set forth in part in the description that follows, and in part will become apparent to those skilled in the art upon examining the following or may be learned by practice of the invention. These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

With reference now to the drawings, a vortex tube is being placed in an engine, to cool air prior to the air entering the intake manifold, in order to increase the engine operating efficiency. The vortex tube may be employed with a turbocharger, a supercharger, with an engine which does not include an air compressor, or with an auxiliary compressed air source.

Figure 1:
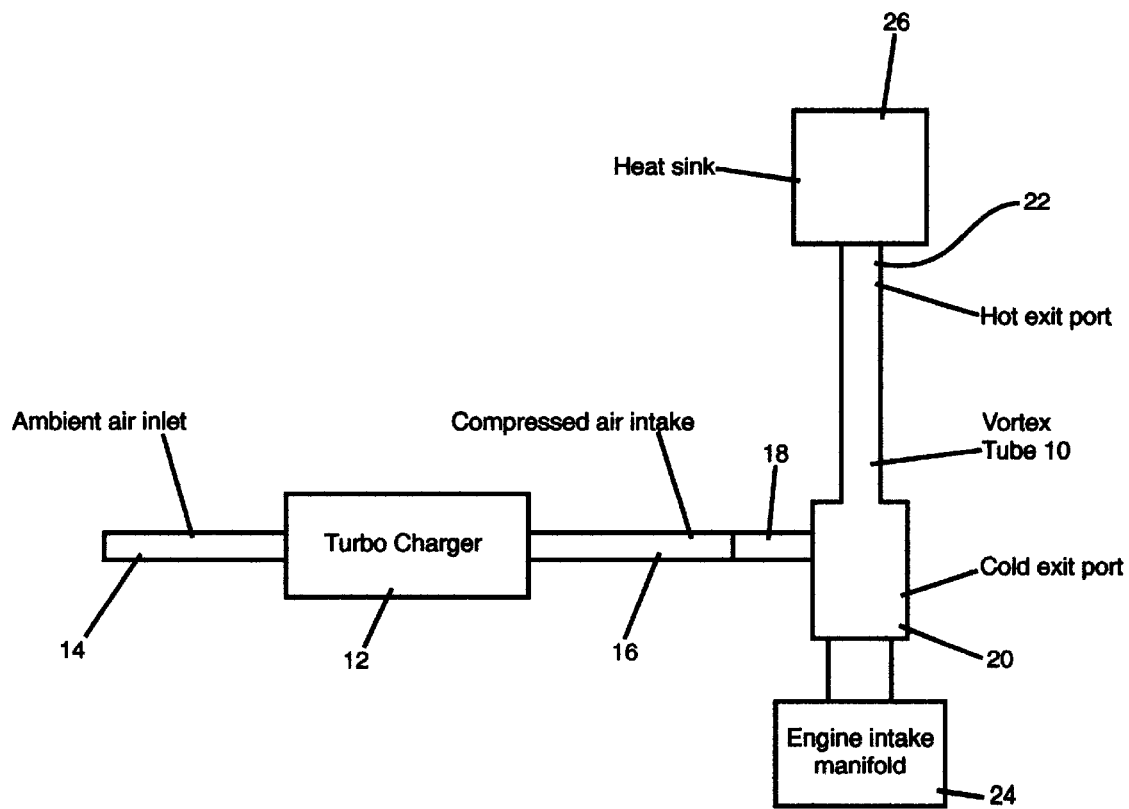
FIG. 1 is a schematic diagram of the vortex tube in communication with the compressed air outlet of the turbocharger with the hot exit port of the vortex tube in communication with a heat sink.
Figure 2:
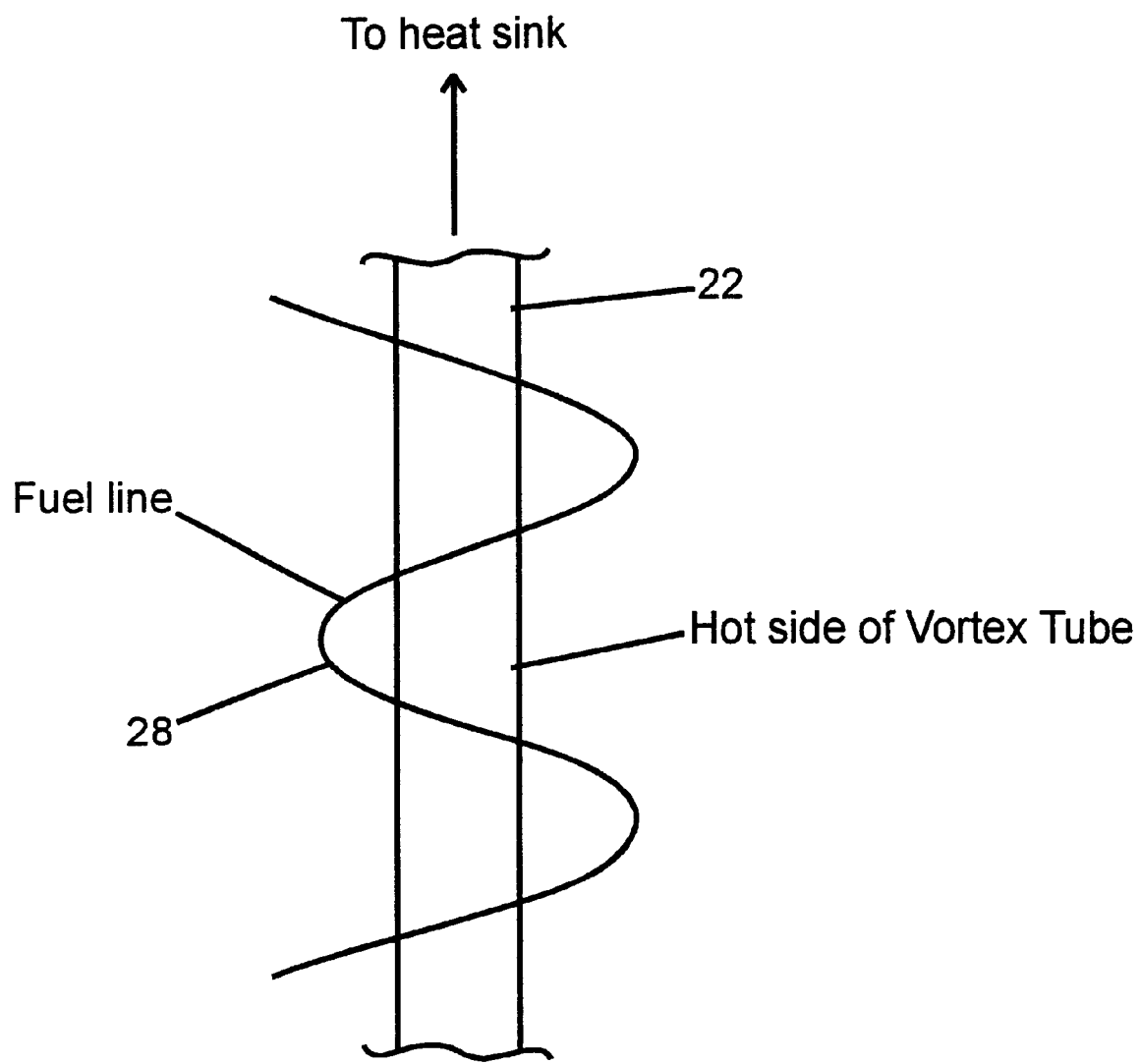
FIG. 2 is a view of the fuel line in a proximal relation to the hot side of the vortex tube, wherein the hot exit port of the vortex tube is in communication with a heat sink.

Referring now to FIG. 1, the vortex tube 10 is affixed to a turbocharger 12 in an engine. The turbocharger 12 includes an ambient air inlet 14 and a compressed air outlet 16, the compressive energy coming from the exhaust gasses of the engine. The vortex tube 10 has an entry port 18, cold exit port 20 and a hot exit port 22. In a first embodiment, the vortex tube entry port 18 is placed in communication with the turbocharger's compressed air outlet 16 by any conventional means. This causes the compressed air to enter the vortex tube 10, and be separated into a hot portion and a cold portion. The cold portion exits the vortex tube cold exit port 20 and is routed to the engine's intake manifold 24. The hot portion exits the vortex tube hot exit port 22 and is routed to a heat sink 26. Referring now to FIG. 2, the fuel line 28 has been placed in proximal relation to the hot exit port 22, permitting heat to transfer to the fuel. This is particularly advantageous in a fuel such as diesel fuel.

Figure 3:
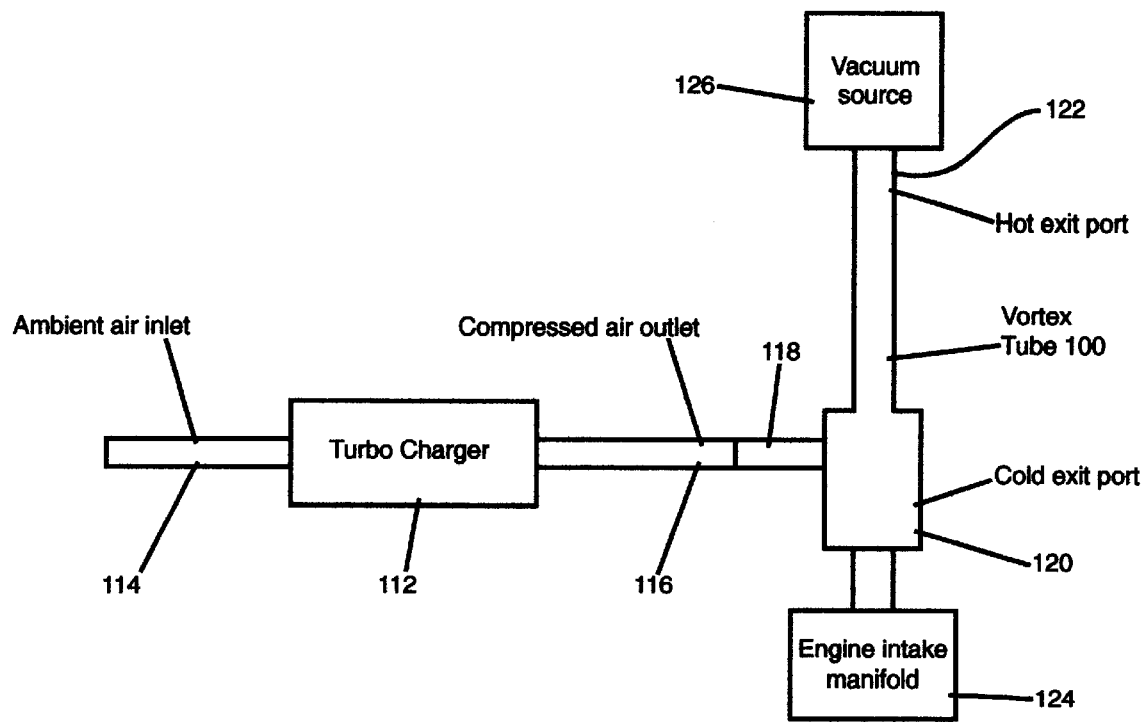
FIG. 3 is a schematic diagram of the vortex tube in communication with the compressed air outlet of the turbocharger with the hot exit port of the vortex tube in communication with a vacuum source.

Referring now to FIG. 3, the vortex tube 100 is affixed to a turbocharger 112 in an engine. The turbocharger 112 includes an ambient air inlet 114 and a compressed air outlet 116, the compressive energy coming from the exhaust gasses of the engine. The vortex tube 100 has an entry port 118, cold exit port 120 and a hot exit port 122. In this second embodiment, the vortex tube entry port 118 is placed in communication with the turbocharger's compressed air outlet 116 by any conventional means. This causes the compressed air to enter the vortex tube 100, and be separated into a hot portion and a cold portion. The cold portion exits the vortex tube cold exit port 120 and is routed to the engine's intake manifold 124. The hot portion exits the vortex tube hot exit port 122 and is routed to a vacuum source 126. The vacuum source 126 may be provided by any of a variety of negative pressure inducing means.

Figure 4:
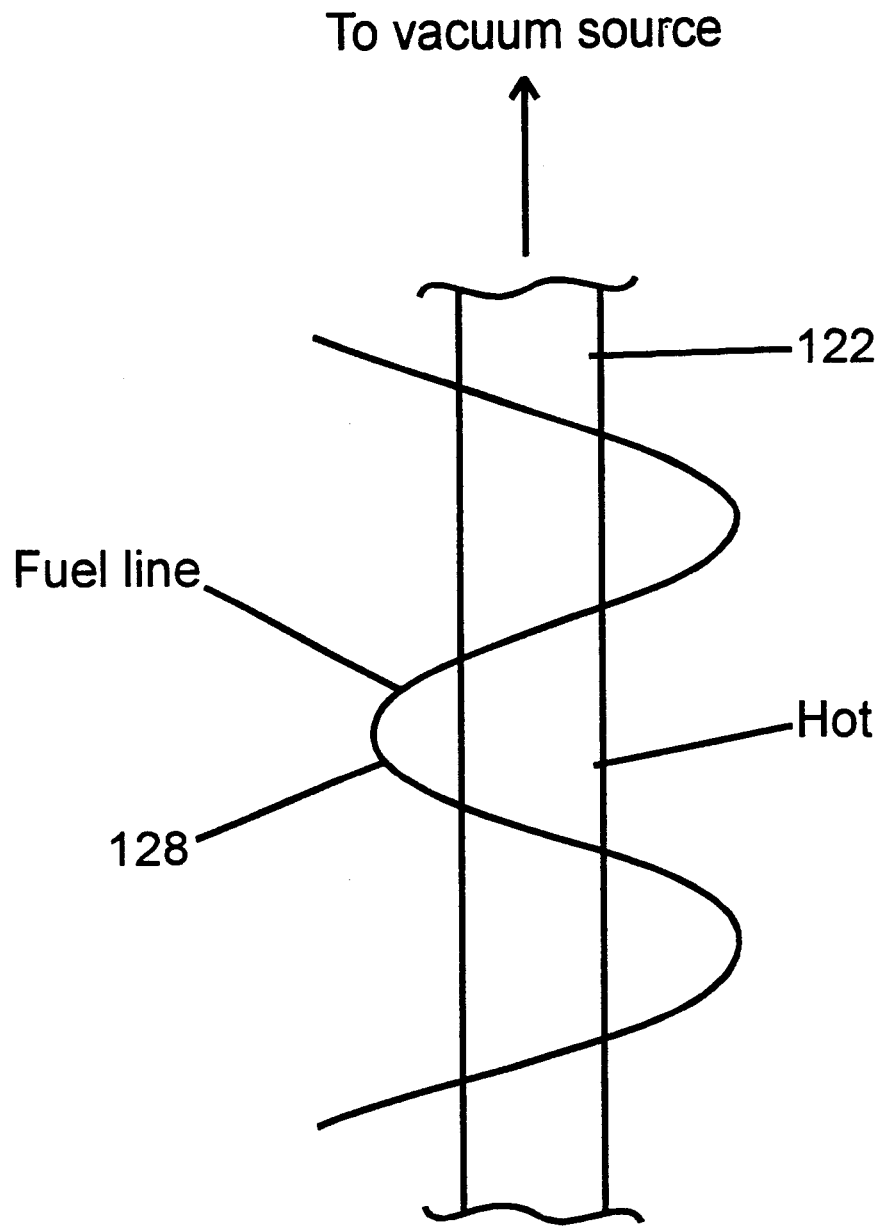
FIG. 4 is a view of the fuel line in a proximal relation to the hot side of the vortex tube, wherein the hot exit port of the vortex tube is in communication with a vacuum source.
Figure 5:
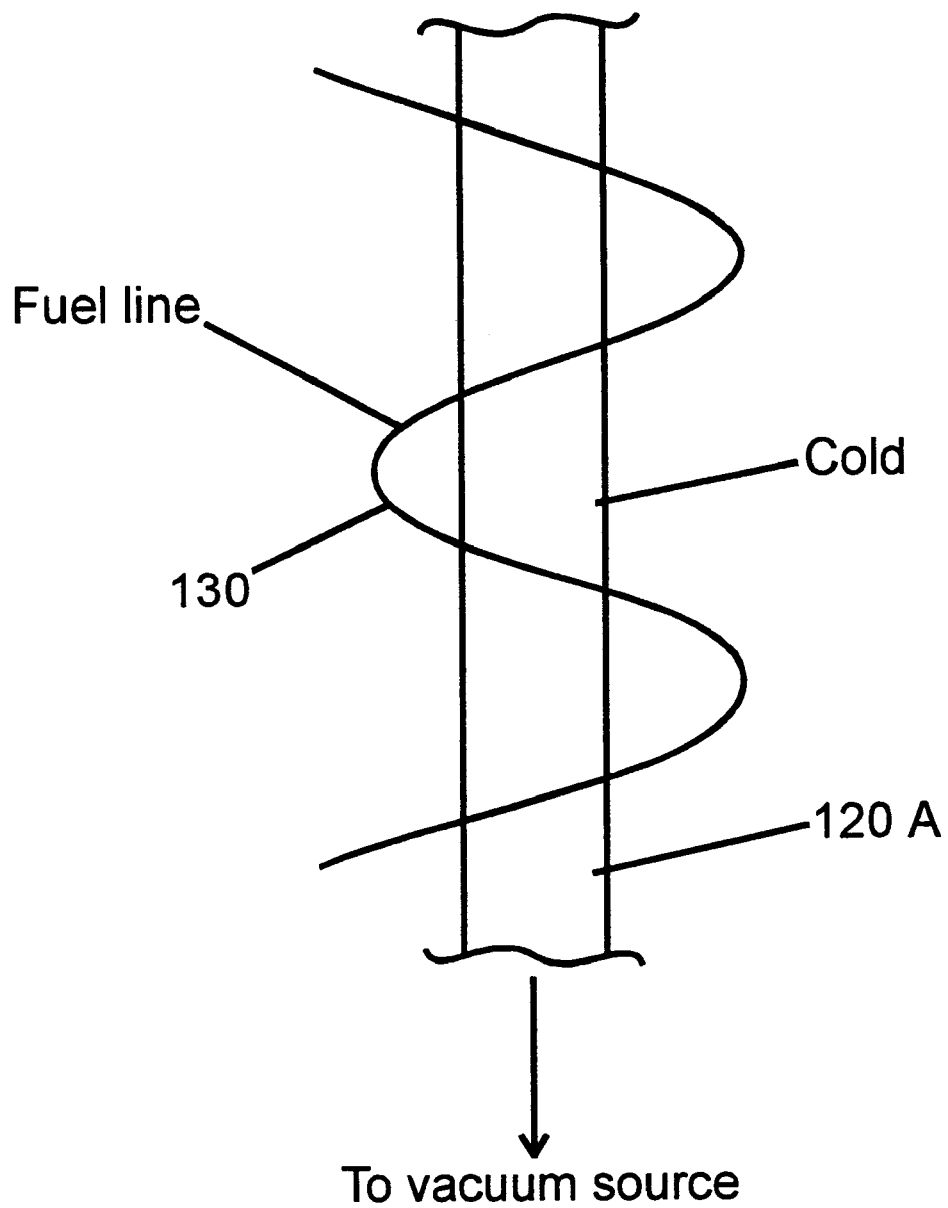
FIG. 5 is a view of the fuel line in a proximal relation to the cold side of the vortex tube, wherein the cold side of the vortex tube is in communication with the engine intake manifold.

Referring now to FIG. 4, the fuel line 128 has been placed in proximal relation to the hot exit port 122, permitting heat to transfer to the fuel. This is particularly advantageous in a fuel such as diesel fuel. Referring now to FIG. 5, another embodiment is disclosed where the fuel line 130 is placed in proximal relation to the cold exit port 120A of a vortex tube. This permits heat transfer from the fuel. This is particularly advantageous in a fuel such as gasoline.

Figure 6:
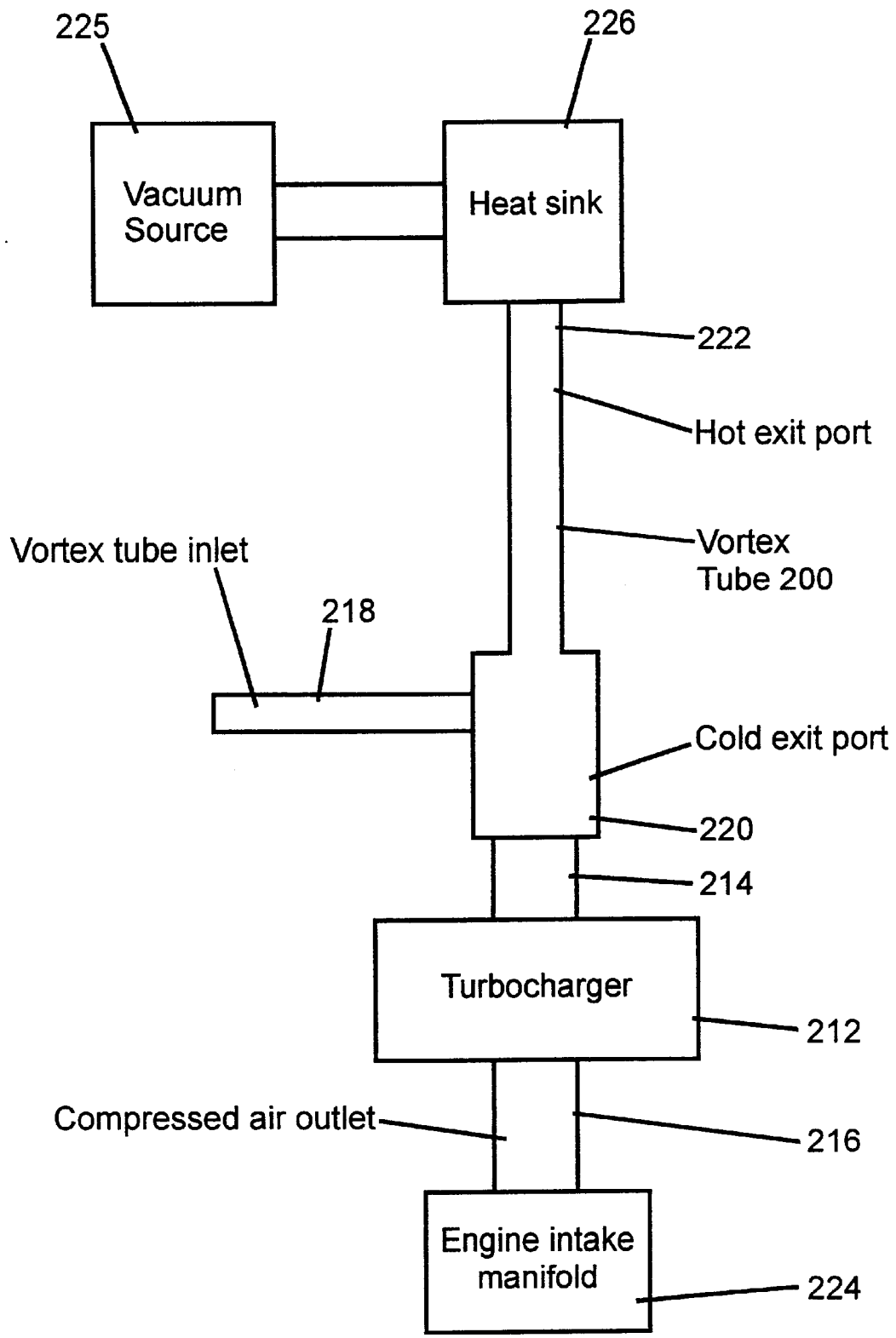
FIG. 6 is a schematic diagram of the vortex tube cold exit port in communication with the ambient air inlet of the turbocharger with the hot exit port of the vortex tube in communication with a heat sink.

Referring now to FIG. 6, the vortex tube 200 is affixed to a turbocharger 212 in an engine. The turbocharger 212 includes an ambient air inlet 214 and a compressed air outlet 216, the compressive energy coming from the exhaust gasses of the engine. The vortex tube 200 has an entry port 218, cold exit port 220 and a hot exit port 222. In this embodiment, the vortex tube cold exit port 220 is placed in communication with the turbocharger's ambient air inlet 214 by any conventional means. Air is caused to enter the vortex tube entry port 218, by action of the turbocharger 212 and vacuum source 225, where it is separated into a hot portion and a cold portion. The cold portion exits the vortex tube cold exit port 220 and is directed into the turbocharger's ambient air inlet 214. This cooled air is then compressed by the turbocharger 212, where it exits the compressed air outlet 216, still in a cooled condition. The compressed air outlet 216 of the turbocharger 212 is in communication with the engine's intake manifold 224. The hot portion exits the vortex tube hot exit port 222 and is routed to a heat sink 226 and subsequently to the vacuum source 225.

Figure 7:
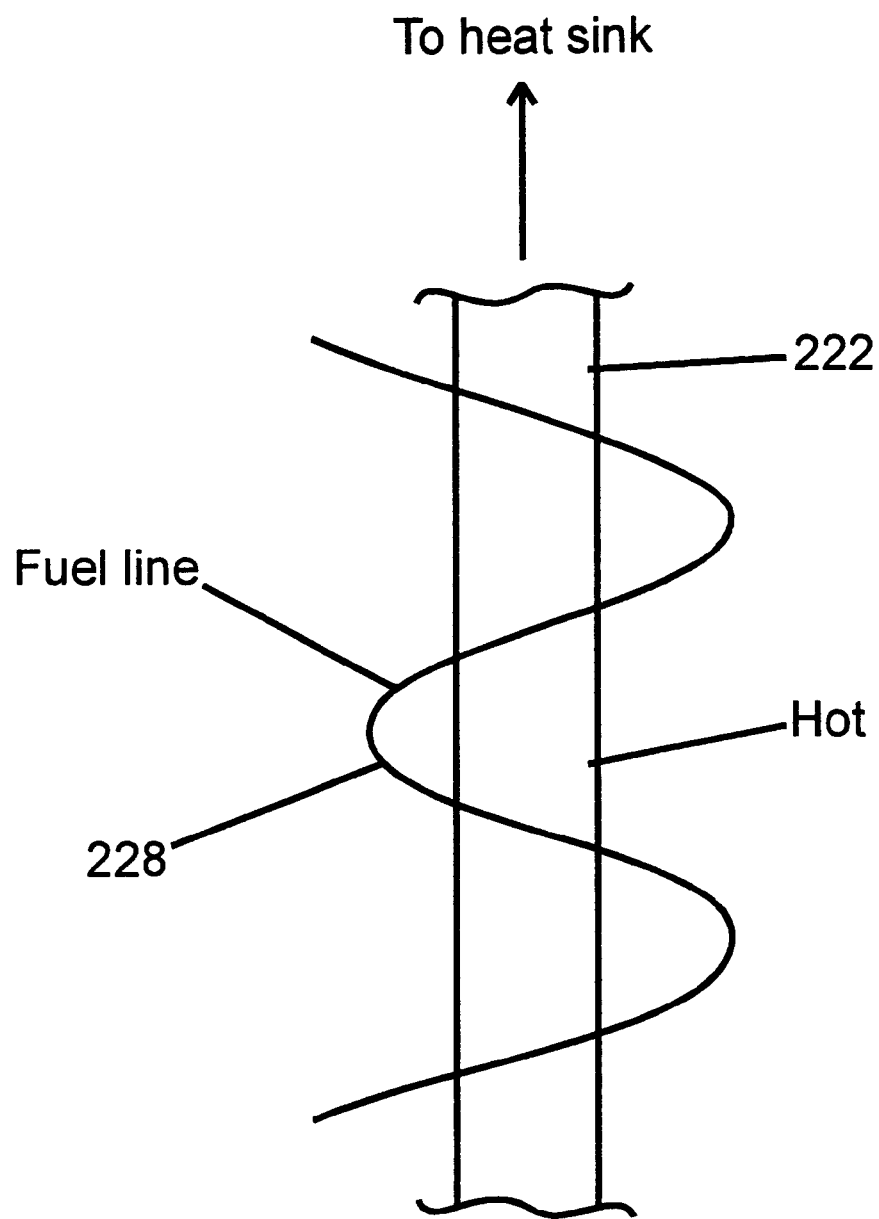
FIG. 7 is a view of the fuel line in a proximal relation to the hot side of the vortex tube, wherein the hot exit port of the vortex tube is in communication with a heat sink, and the cold exit port is in communication with the ambient air inlet of the turbocharger.

Referring now to FIG. 7, the fuel line 228 has been placed in proximal relation to the hot exit port 222, permitting heat to transfer to the fuel. This is particularly advantageous to fuel such as diesel fuel.

Figure 8:
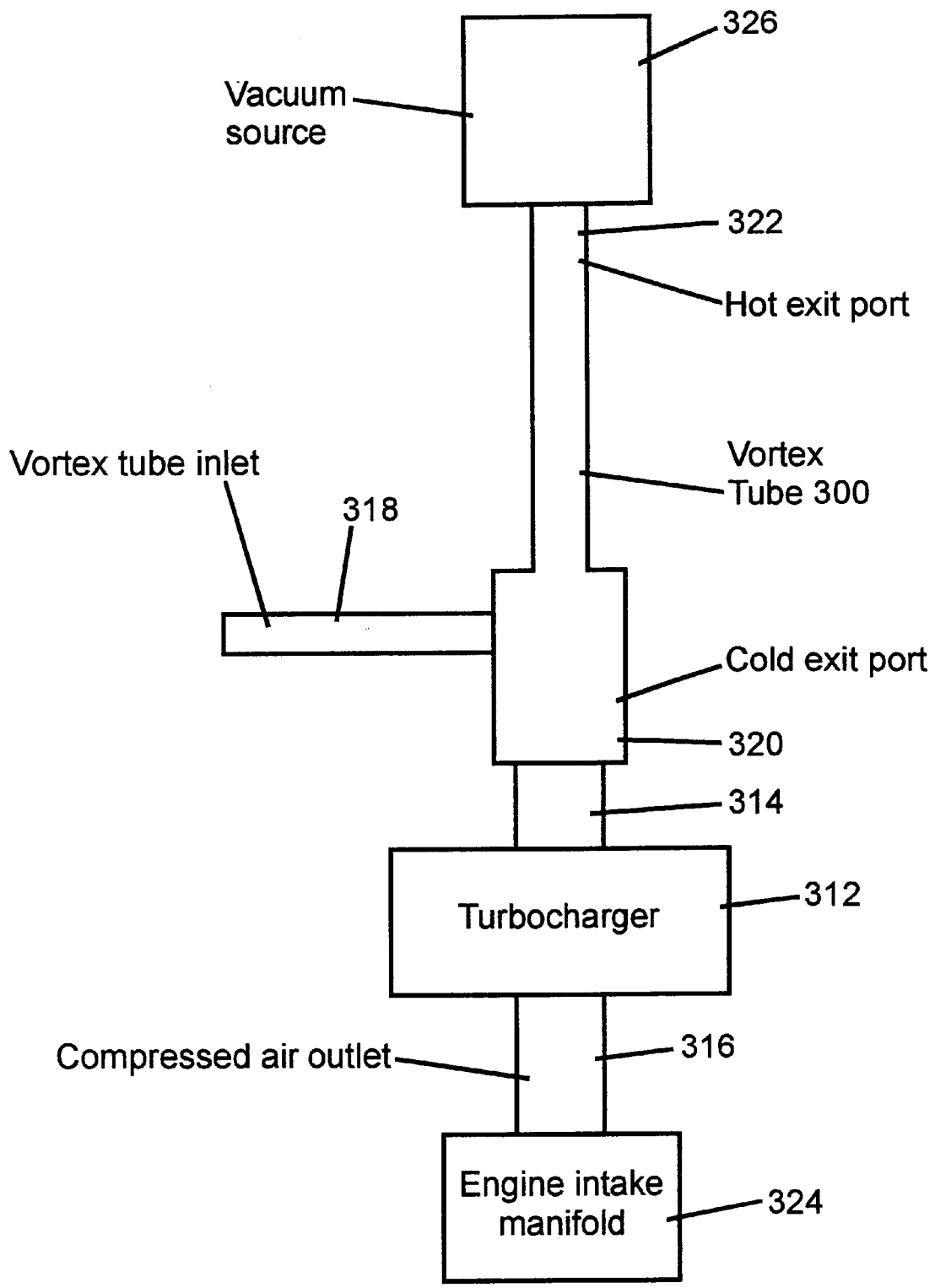
FIG. 8 is a schematic diagram of the vortex tube cold exit port in communication with the ambient air inlet of the turbocharger with the hot exit port of the vortex tube in communication with a vacuum source.

Referring now to FIG. 8, the vortex tube 300 is affixed to a turbocharger 312 in an engine. The turbocharger 312 includes an ambient air inlet 314 and a compressed air outlet 316, the compressive energy coming from the exhaust gasses of the engine. The vortex tube 300 has an entry port 318, cold exit port 320 and a hot exit port 322. In this embodiment, the vortex tube cold exit port 320 is placed in communication with the turbocharger's ambient air inlet 314 by any conventional means. Air is caused to enter the vortex tube entry port 318, by action of the turbocharger 312, where it is separated into a hot portion and a cold portion. The cold portion exits the vortex tube cold exit port 320 and is directed into the turbocharger's ambient air inlet 314. This cooled air is then compressed by the turbocharger 312, where it exits the compressed air outlet 316, still in a cooled condition. The compressed air outlet 316 of the turbocharger 312 is in communication with the engine's intake manifold 324. The hot portion exits the vortex tube hot exit port 322 and is routed to a vacuum source 326.

Figure 9:
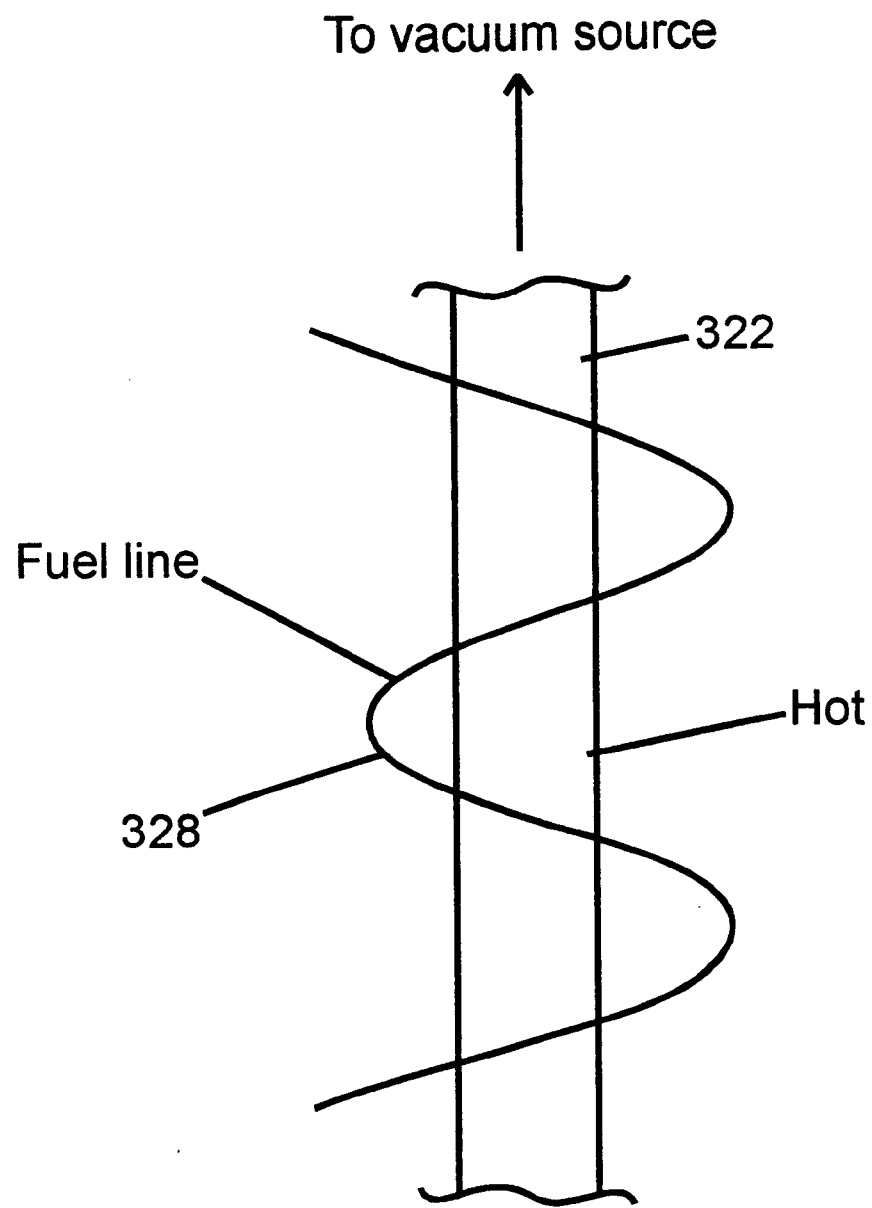
FIG. 9 is a view of the fuel line in a proximal relation to the hot side of the vortex tube, wherein the hot exit port of the vortex tube is in communication with a vacuum source, and the cold exit port is in communication with the ambient air inlet of the turbocharger.

Referring now to FIG. 9, the fuel line 328 has been placed in proximal relation to the hot exit port 322, permitting heat to transfer to the fuel. This is particularly advantageous to fuel such as diesel fuel.

Figure 10:
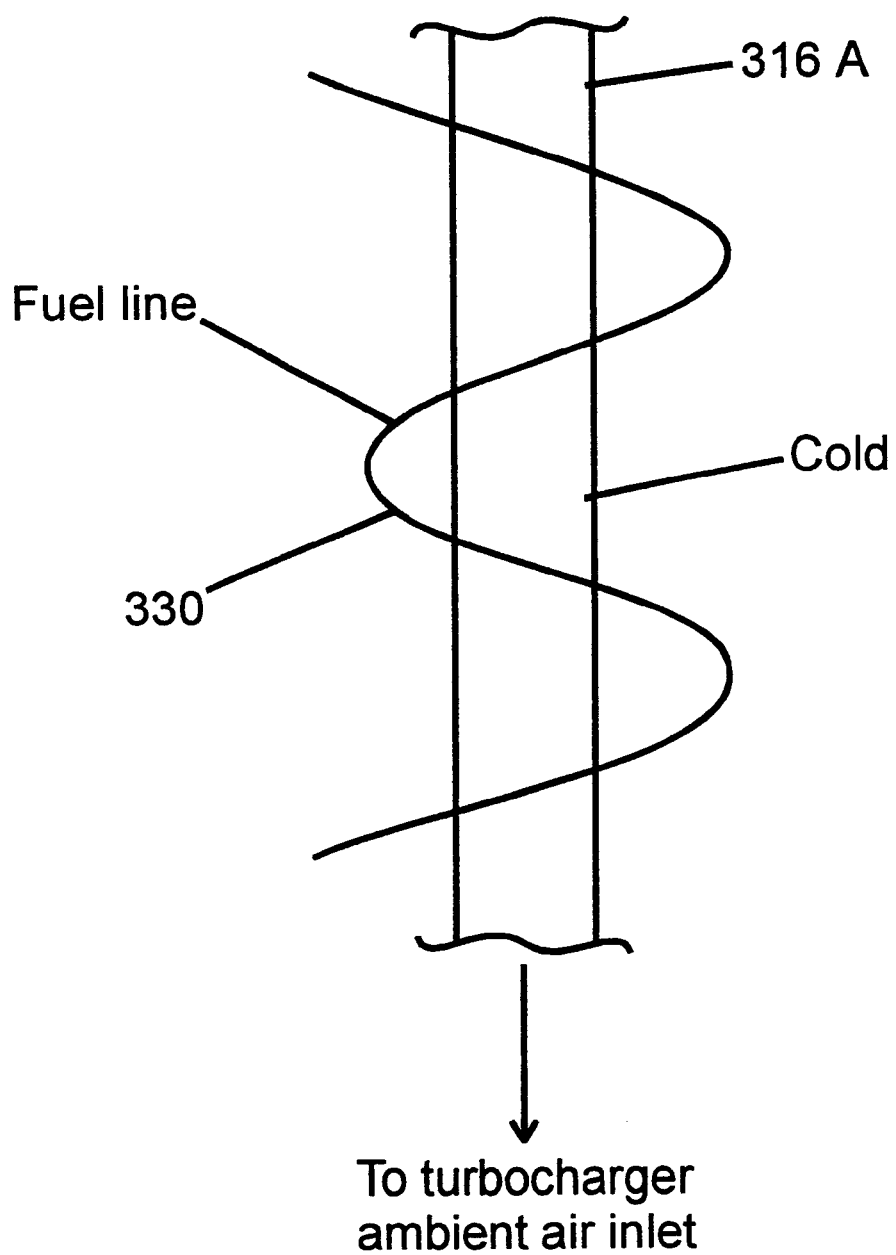
FIG. 10 is a view of the fuel line in a proximal relation to the cold side of the vortex tube, wherein the cold side of the vortex tube is in communication with the ambient air inlet of the turbocharger.

Referring now to FIG. 10, another embodiment is disclosed where the fuel line 330 is placed in proximal relation to the cold exit port 316A of a vortex tube. This permits heat transfer from the fuel. This is particularly advantageous in a fuel such as gasoline.

Figure 11:
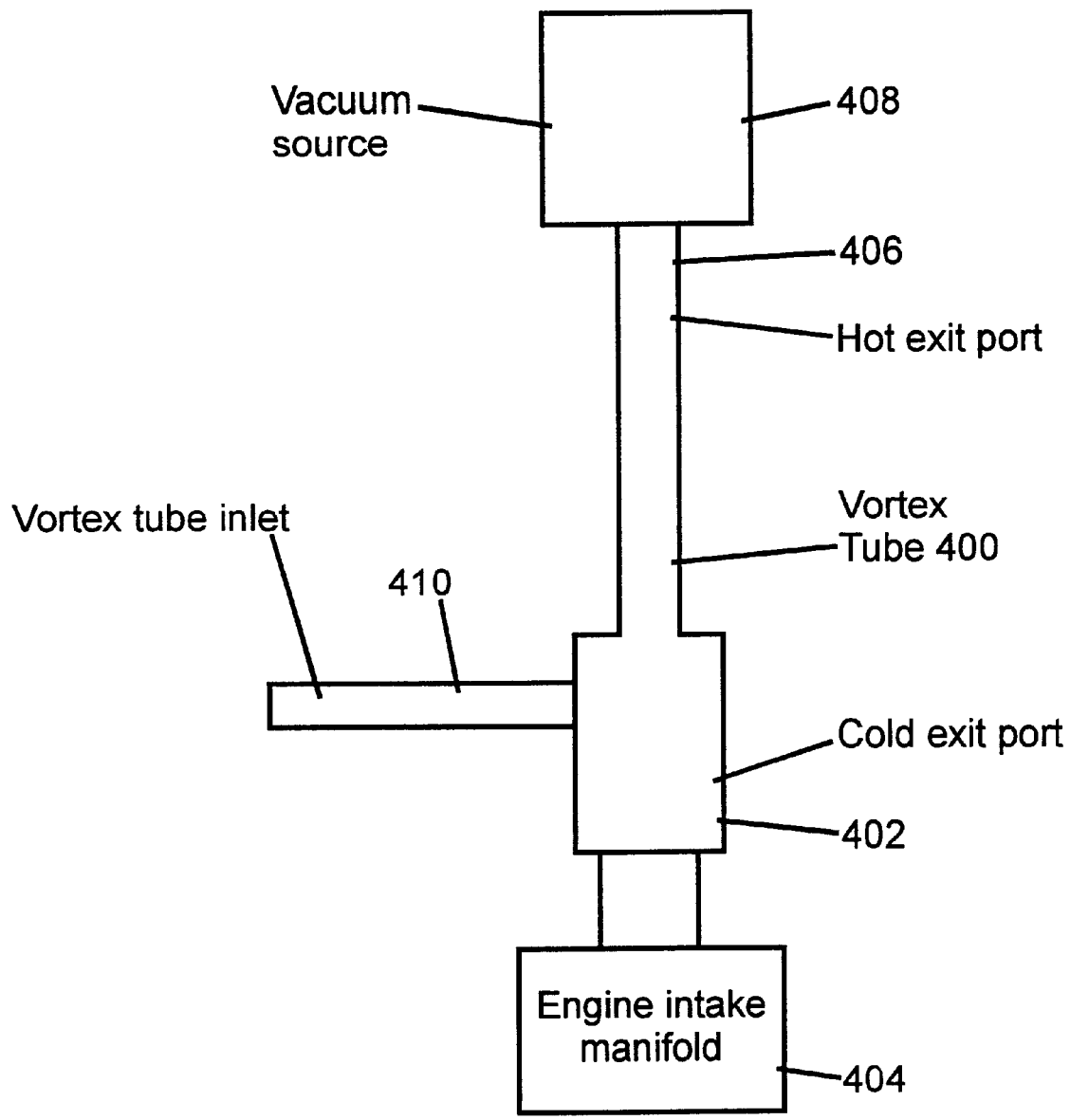
FIG. 11 is a view of the vortex tube cold exit port in communication with the engine intake manifold, and the vortex tube hot exit port in communication with a vacuum source.

Referring now to FIG. 11, a vortex tube 400 has been placed with the cold exit port 402 in communication with the engine's intake manifold 404. The hot exit port 406 would be in communication with a vacuum source 408 as described before. Air would enter the vortex tube's entry port 410 where it would be separated into the hot and cold components. The cooled air would enter the engine manifold 404. Similar arrangements as described in previous embodiments concerning the heating or cooling of fuel may also be employed in this embodiment.

Figure 12:
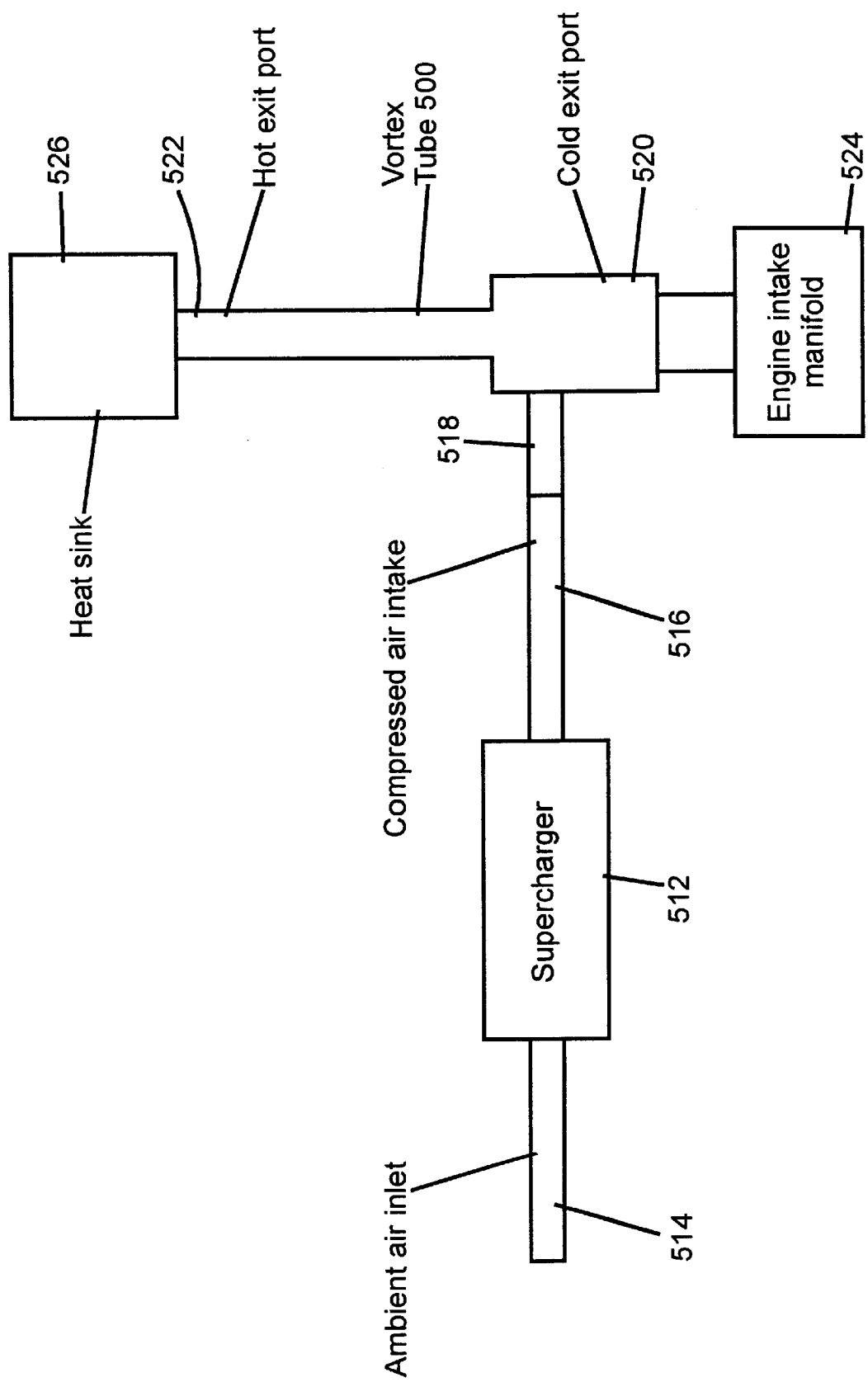
FIG. 12 is a schematic diagram of the vortex tube in communication with the compressed air outlet of the supercharger with the hot exit port of the vortex tube in communication with a heat sink.
Figure 13:
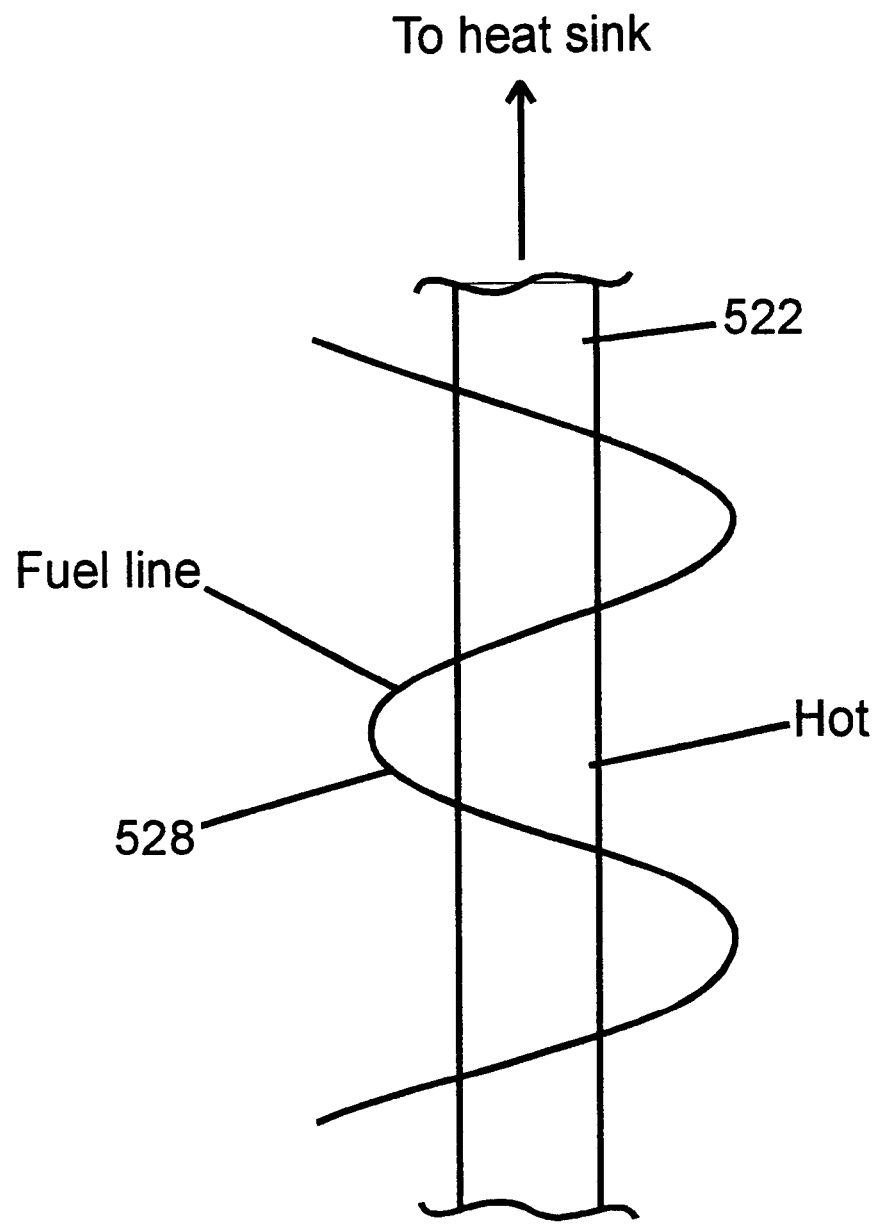
FIG. 13 is a view of the fuel line in a proximal relation to the hot side of the vortex tube, wherein the hot exit port of the vortex tube is in communication with a heat sink.

Referring now to FIG. 12, the vortex tube 500 is affixed to a supercharger 512 in an engine. The supercharger 512 includes an ambient air inlet 514 and a compressed air outlet 516, the compressive energy coming from a mechanical connection to the crankshaft. The vortex tube 500 has an entry port 518, cold exit port 520 and a hot exit port 522. In this embodiment, the vortex tube entry port 518 is placed in communication with the supercharger's compressed air outlet 516 by any conventional means. This causes the compressed air to enter the vortex tube 500, and be separated into a hot portion and a cold portion. The cold portion exits the vortex tube cold exit port 520 and is routed to the engine's intake manifold 524. The hot portion exits the vortex tube hot exit port 522 and is routed to a heat sink 526. Referring now to FIG. 13, the fuel line 528 has been placed in proximal relation to the hot exit port 522, permitting heat to transfer to the fuel. This is particularly advantageous in a fuel such as diesel fuel.

Figure 14:
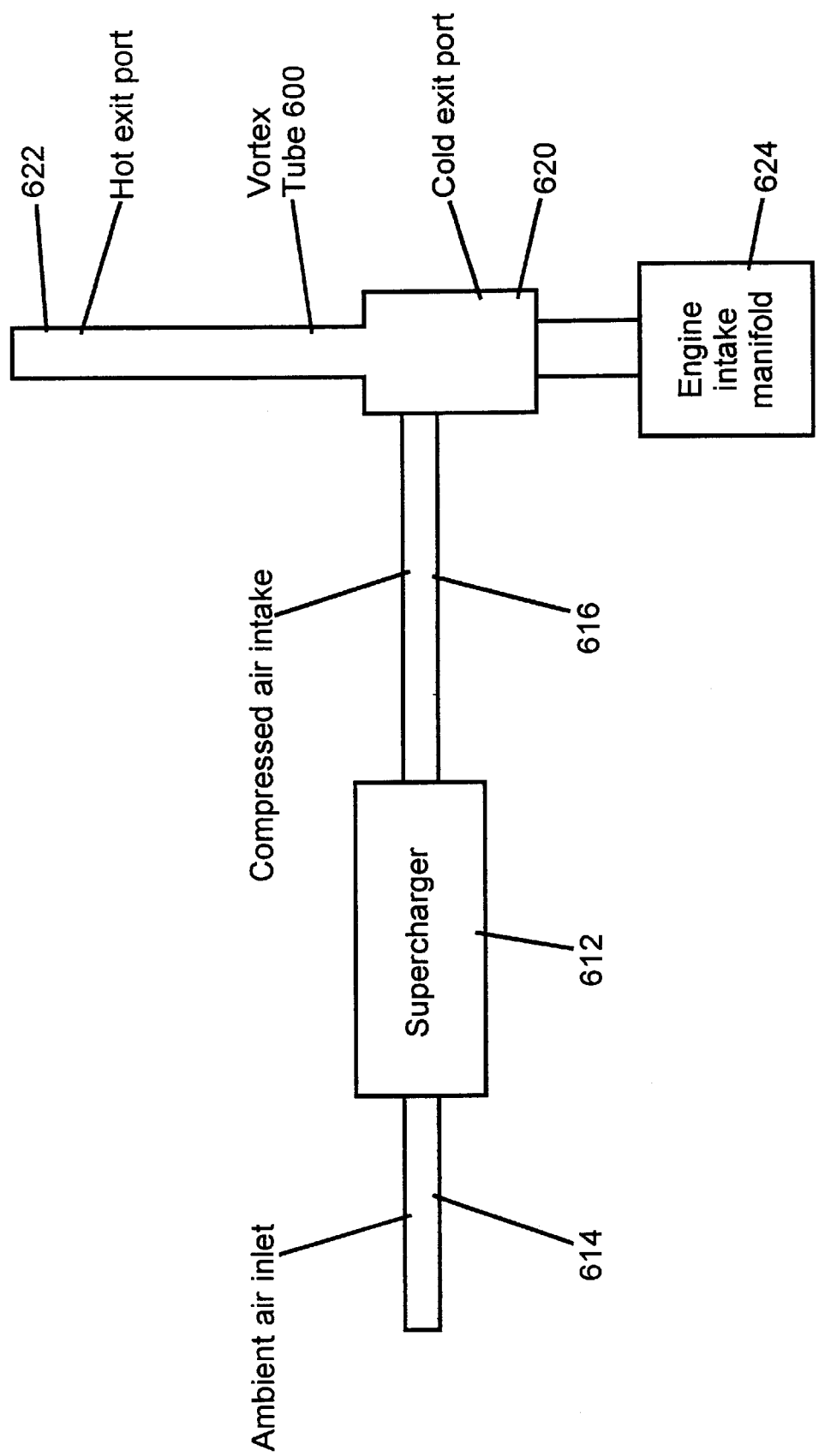
FIG. 14 is a schematic diagram of the vortex tube in communication with the compressed air outlet of the supercharger with the hot exit port of the vortex tube in communication with a vacuum source.

Referring now to FIG. 14, the vortex tube 600 is affixed to a supercharger 612 in an engine. The supercharger 612 includes an ambient air inlet 614 and a compressed air outlet 616, the compressive energy coming from a mechanical connection to the crankshaft. The vortex tube 600 has an entry port 618, cold exit port 620 and a hot exit port 622. In this embodiment, the vortex tube entry port 618 is placed in communication with the supercharger's compressed air outlet 616 by any conventional means. This causes the compressed air to enter the vortex tube 600, and be separated into a hot portion and a cold portion. The cold portion exits the vortex tube cold exit port 620 and is routed to the engine's intake manifold 624. The hot portion exits the vortex tube hot exit port 622.

Figure 15:
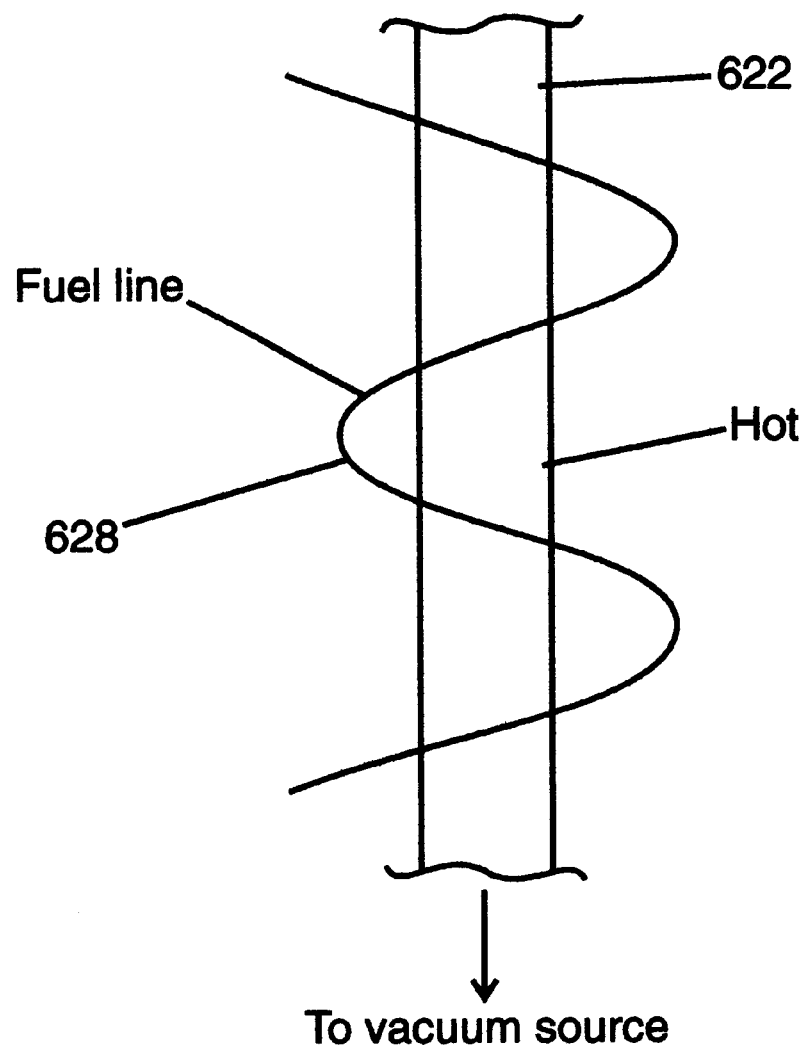
FIG. 15 is a view of the fuel line in a proximal relation to the hot side of the vortex tube, wherein the hot exit port of the vortex tube is in communication with a vacuum source.

Referring now to FIG. 15, the fuel line 628 has been placed in proximal relation to the hot exit port 622, permitting heat to transfer to the fuel. This is particularly advantageous in a fuel such as diesel fuel.

Figure 16:
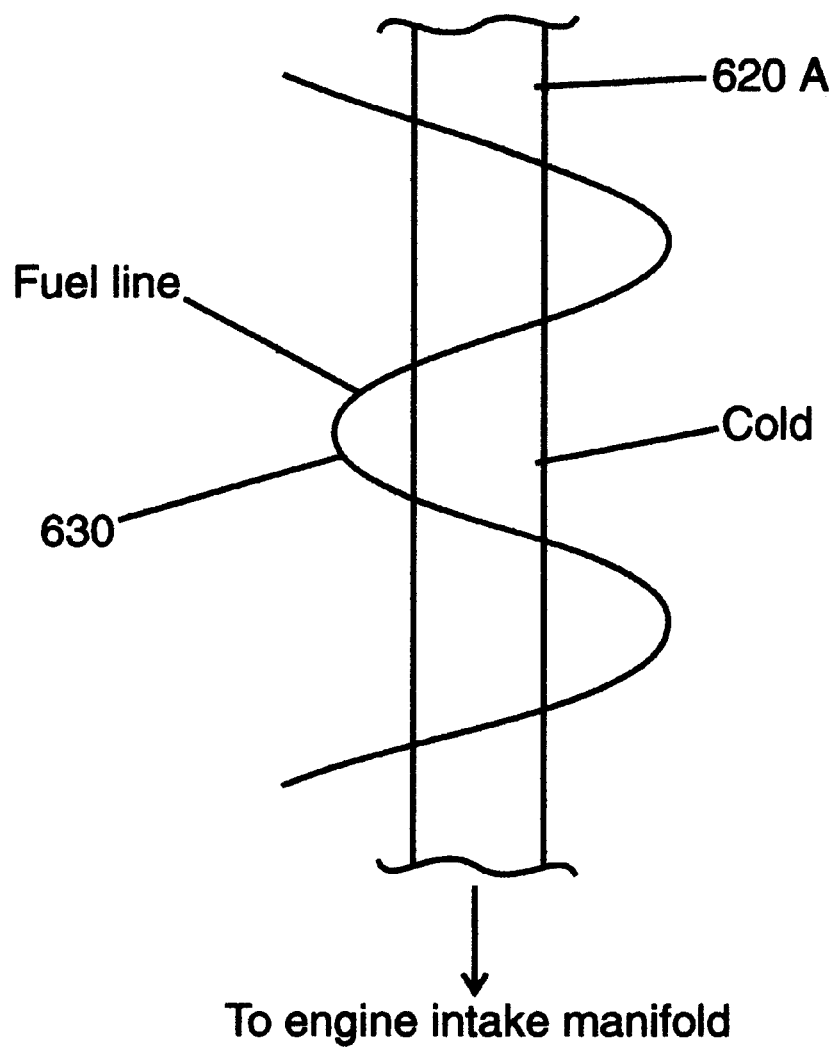
FIG. 16 is a view of the fuel line in a proximal relation to the cold side of the vortex tube, wherein the cold side of the vortex tube is in communication with the engine intake manifold.

Referring now to FIG. 16, another embodiment is disclosed where the fuel line 630 is placed in proximal relation to the cold exit port 620A of a vortex tube. This permits heat transfer from the fuel. This is particularly advantageous in a fuel such as gasoline.

Figure 17:
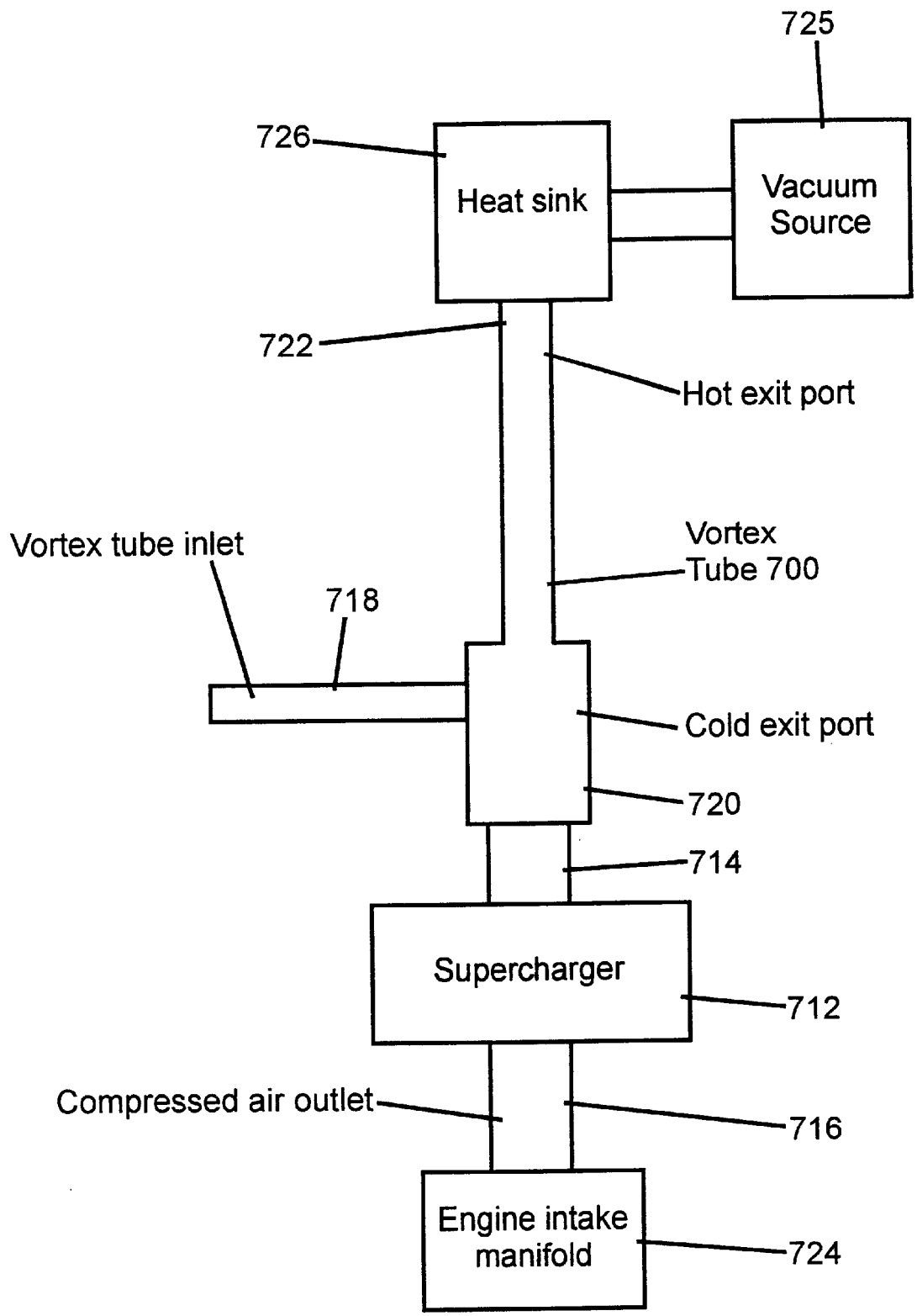
FIG. 17 is a schematic diagram of the vortex tube cold exit port in communication with the ambient air inlet of the supercharger with the hot exit port of the vortex tube in communication with a heat sink.

Referring now to FIG. 17, the vortex tube 700 is affixed to a supercharger 712 in an engine. The supercharger 712 includes an ambient air inlet 714 and a compressed air outlet 716, the compressive energy coming from coming from a mechanical connection to the crankshaft. The vortex tube 700 has an entry port 718, cold exit port 720 and a hot exit port 722. In this embodiment, the vortex tube cold exit port 720 is placed in communication with the supercharger's ambient air inlet 714 by any conventional means. Air is caused to enter the vortex tube entry port 718, by action of the supercharger 712 and vacuum source 725, where it is separated into a hot portion and a cold portion. The cold portion exits the vortex tube cold exit port 720 and is directed into the supercharger's ambient air inlet 714. This cooled air is then compressed by the supercharger 712, where it exits the compressed air outlet 716, still in a cooled condition. The compressed air outlet 716 of the supercharger 712 is in communication with the engine's intake manifold 724. The hot portion exits the vortex tube hot exit port 722 and is routed to a heat sink 726 and subsequently to a vacuum source 725.

Figure 18:
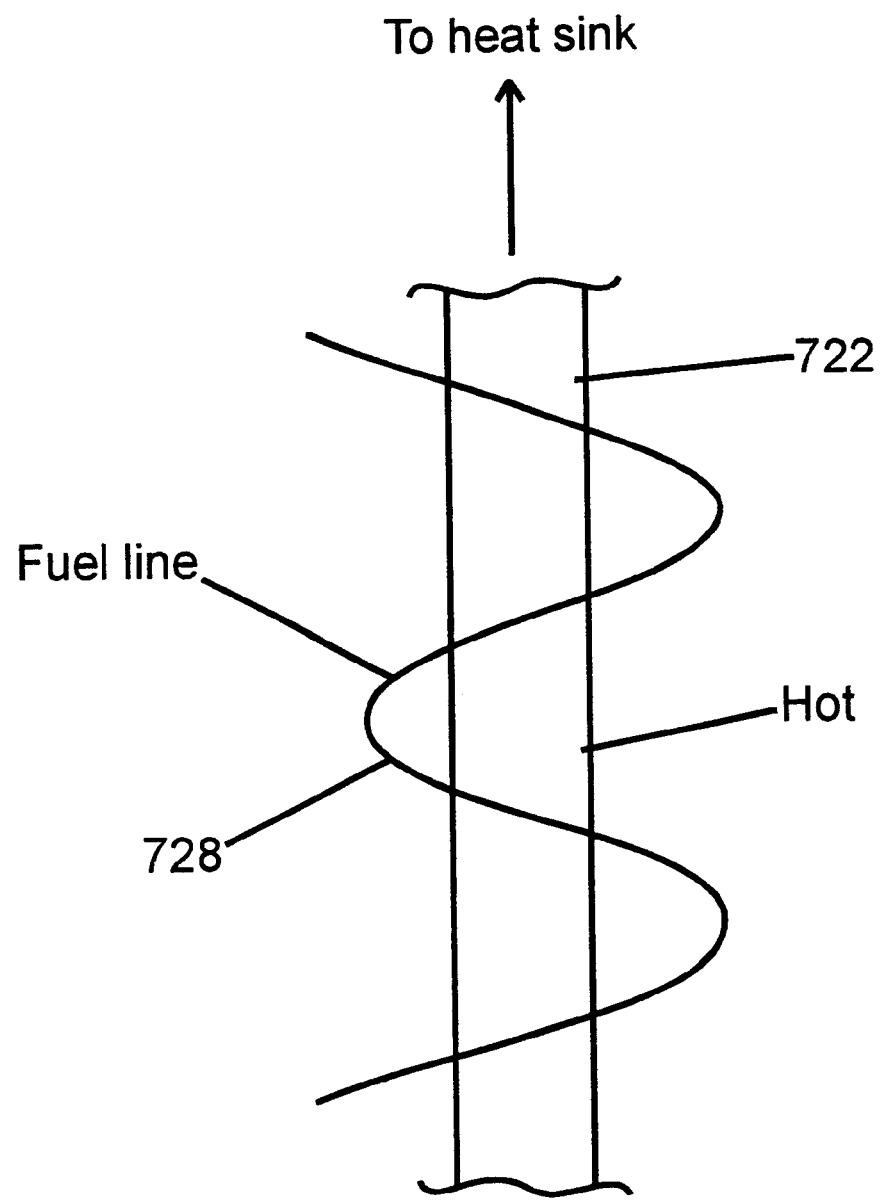
FIG. 18 is a view of the fuel line in a proximal relation to the hot side of the vortex tube, wherein the hot exit port of the vortex tube is in communication with a heat sink, and the cold exit port is in communication with the ambient air inlet of the supercharger.

Referring now to FIG. 18, the fuel line 728 has been placed in proximal relation to the hot exit port 722, permitting heat to transfer to the fuel. This is particularly advantageous to fuel such as diesel fuel, propane, liquified natural gas or the like.

Figure 19:
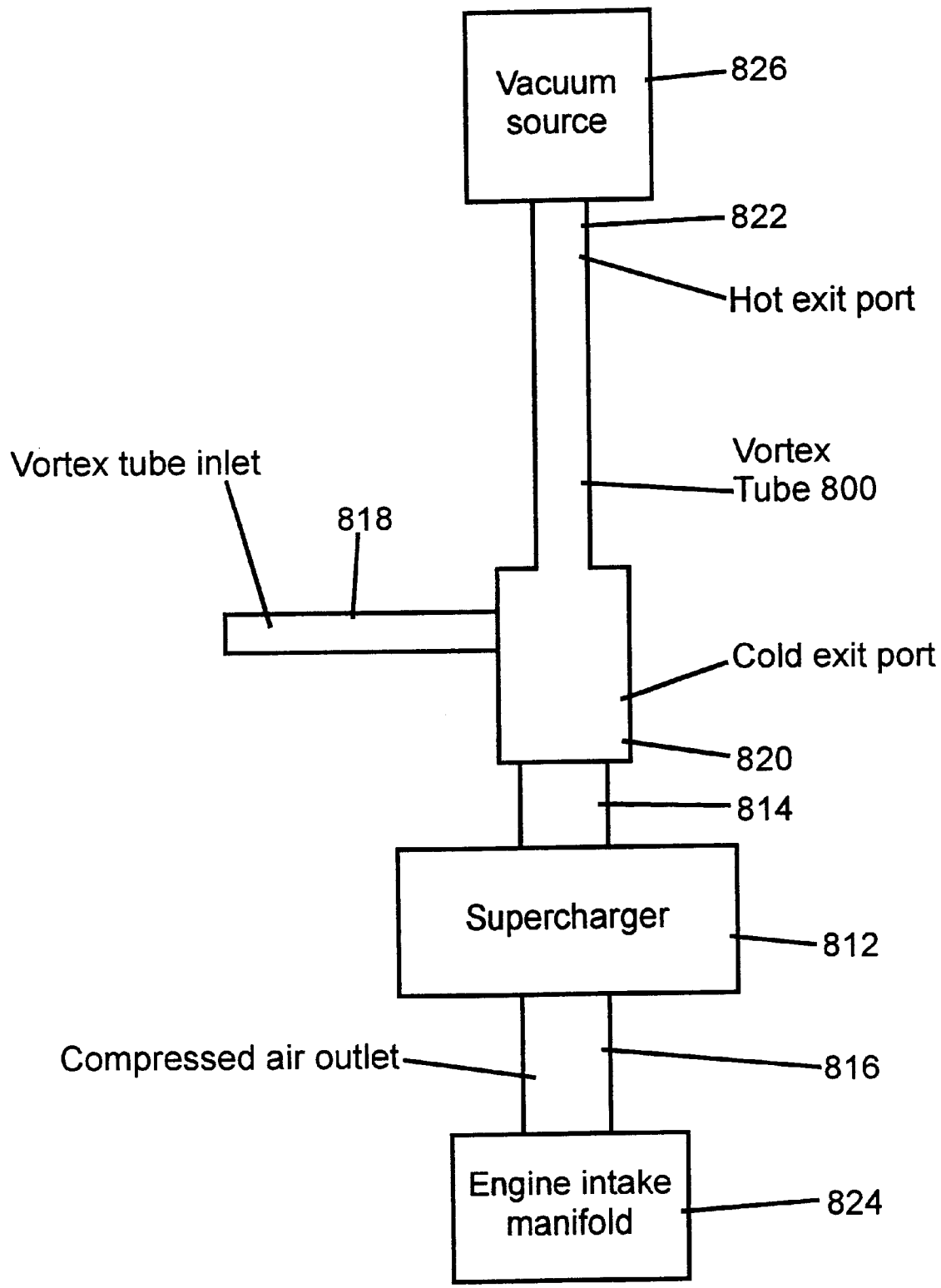
FIG. 19 is a schematic diagram of the vortex tube cold exit port in communication with the ambient air inlet of the supercharger with the hot exit port of the vortex tube in communication with a vacuum source.

Referring now to FIG. 19, the vortex tube 800 is affixed to a supercharger 812 in an engine. The supercharger 812 includes an ambient air inlet 814 and a compressed air outlet 816, the compressive energy coming from the coming from a mechanical connection to the crankshaft. The vortex tube 800 has an entry port 818, cold exit port 820 and a hot exit port 822. In this embodiment, the vortex tube cold exit port 820 is placed in communication with the supercharger's ambient air inlet 814 by any conventional means. Air is caused to enter the vortex tube entry port 818, by action of the supercharger 812 and vacuum source 826, where it is separated into a hot portion and a cold portion. The cold portion exits the vortex tube cold exit port 820 and is directed into the supercharger's ambient air inlet 814. This cooled air is then compressed by the supercharger 812, where it exits the compressed air outlet 816, still in a cooled condition. The compressed air outlet 816 of the supercharger 812 is in communication with the engine's intake manifold 824. The hot portion exits the vortex tube hot exit port 822 and is routed to a vacuum source 826.

Figure 20:
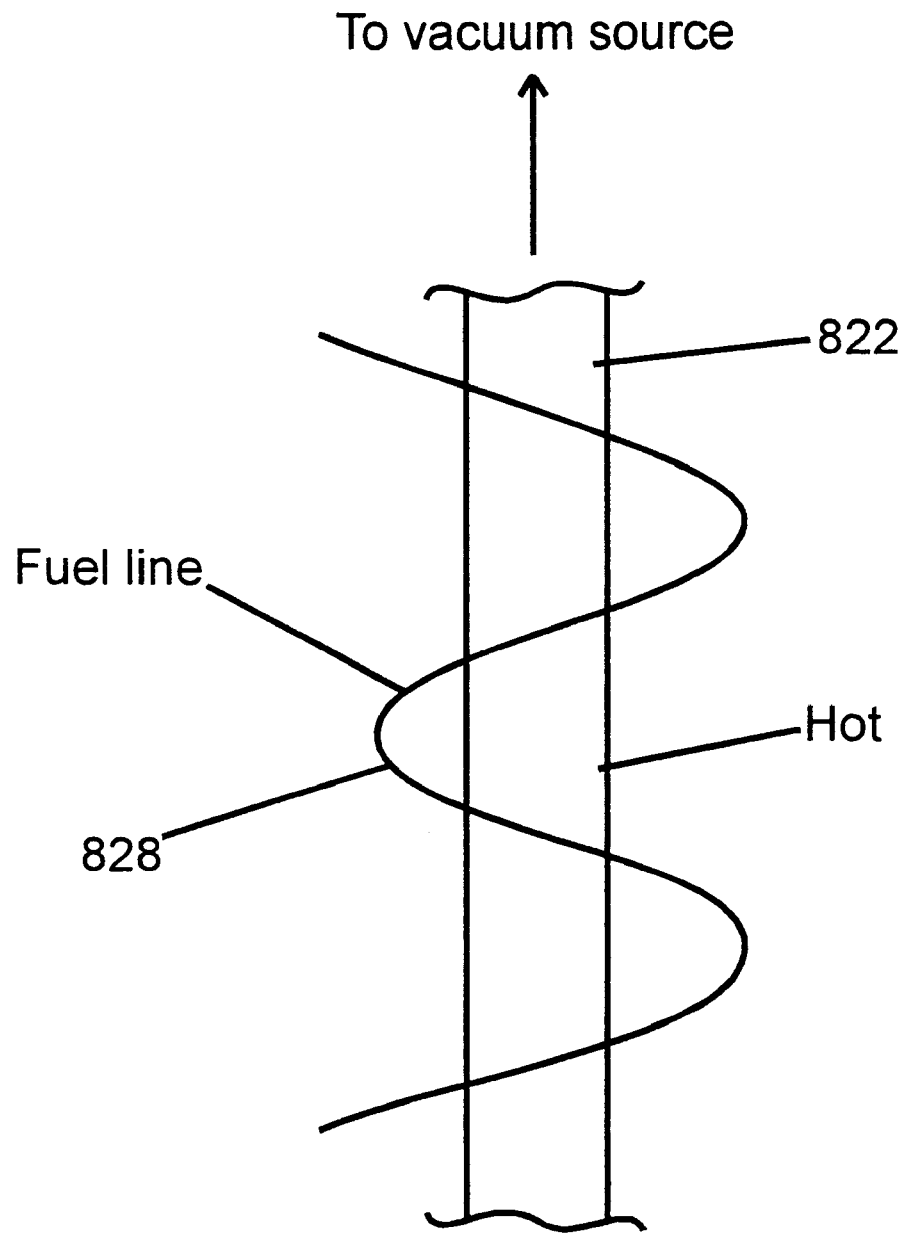
FIG. 20 is a view of the fuel line in a proximal relation to the hot side of the vortex tube, wherein the hot exit port of the vortex tube is in communication with a vacuum source, and the cold exit port is in communication with the ambient air inlet of the supercharger.

Referring now to FIG. 20, the fuel line 828 has been placed in proximal relation to the hot exit port 822, permitting heat to transfer to the fuel. This is particularly advantageous to fuel such as diesel fuel, propane, liquified natural gas or the like.

Figure 21:
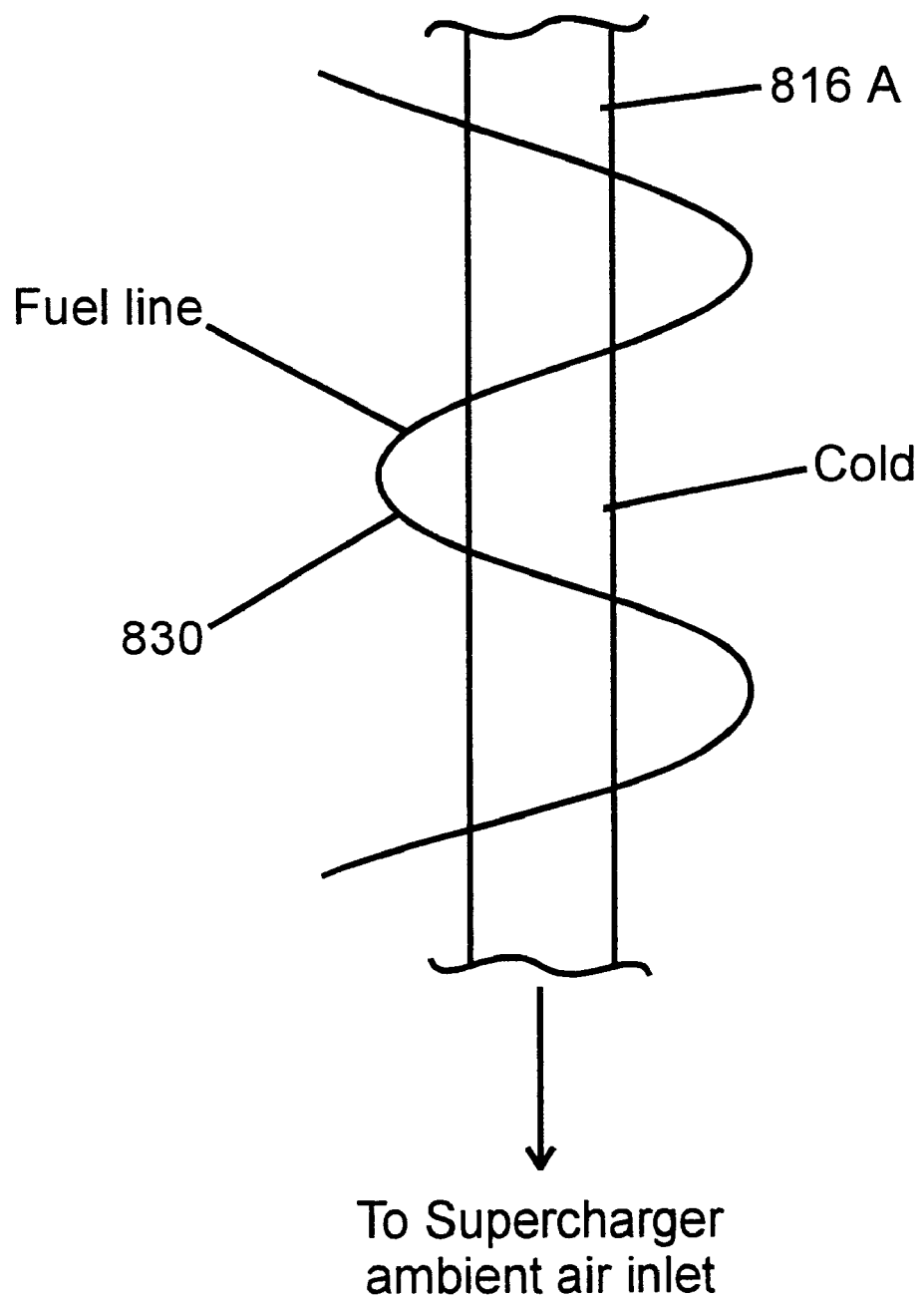
FIG. 21 is a view of the fuel line in a proximal relation to the cold side of the vortex tube, wherein the cold side of the vortex tube is in communication with the ambient air inlet of the supercharger.

Referring now to FIG. 21, another embodiment is disclosed where the fuel line 830 is placed in proximal relation to the cold exit port 816A of a vortex tube. This permits heat transfer from the fuel. This is particularly advantageous in a fuel such as gasoline.

It is apparent from the above that the present invention accomplishes all of the objectives set forth by providing a method and apparatus for employing a vortex tube in an engine, to cool air prior to the air entering the intake manifold. As discussed, the vortex tube may be employed with a turbocharger, a supercharger or with an engine which does not include an air compressor. It is also to be understood that oxidants other than or in addition to air may be heated or cooled in the above embodiments.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical embodiment of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

What is claimed as being new and desired to be protected by Letters Patent of the United States is as follows:

1. An engine including a turbocharger wherein, said turbocharger includes an ambient air inlet and a compressed air outlet, a vortex tube, said vortex tube having an entry port, a cold exit port, and a hot exit port, said hot exit port having a first length, said compressed air outlet connected to said entry port, a fuel line, said fuel line placed in proximal relation with said hot exit port said first length, said vortex tube entry port in communication with a vacuum source, said cold exit port in communication with said engine's intake manifold, whereby the temperature of the air entering said engine's intake manifold is lowered and the temperature of the fuel is raised.

2. An engine, said engine including a vortex tube, said vortex tube having an entry port, a hot exit port, and a cold exit port, said hot exit port having a first length, said hot exit port in communication with a vacuum source, a fuel line, said fuel line placed in proximal relation with said hot exit port said first length, said cold exit port in communication with said engine's intake manifold, whereby the temperature of the air entering said engine's intake manifold is lowered and the temperature of the fuel is raised.

3. An engine including a turbocharger wherein, said turbocharger includes an ambient air inlet and a compressed air outlet, a vortex tube, said vortex tube having an entry port, a cold exit port, and a hot exit port, said cold exit port having a first length, said compressed air outlet connected to said entry port, a fuel line, said fuel line placed in proximal relation with said cold exit port said first length, said vortex tube entry port in communication with a vacuum source, said cold exit port in communication with said engine's intake manifold, whereby the temperature of the air entering said engine's intake manifold is lowered and the temperature of the fuel is lowered.

* * * * *